(12) United States Patent
Shay et al.

(10) Patent No.: US 8,974,861 B2
(45) Date of Patent: Mar. 10, 2015

(54) ALKALINE COATING COMPOSITION FOR AUTODEPOSITION

(75) Inventors: Gregory D. Shay, Cary, NC (US); David J. Brennan, Midland, MI (US); Herbert F. Davis, Zebulon, NC (US)

(73) Assignee: Arkema Inc., King of Prussia, PA (US)

( * ) Notice: Subject to any disclaimer, the term of this patent is extended or adjusted under 35 U.S.C. 154(b) by 691 days.

(21) Appl. No.: 12/867,417

(22) PCT Filed: Feb. 6, 2009

(86) PCT No.: PCT/US2009/000772
§ 371 (c)(1),
(2), (4) Date: Dec. 3, 2010

(87) PCT Pub. No.: WO2009/102409
PCT Pub. Date: Aug. 20, 2009

(65) Prior Publication Data
US 2011/0097503 A1    Apr. 28, 2011

Related U.S. Application Data

(60) Provisional application No. 61/065,854, filed on Feb. 15, 2008.

(51) Int. Cl.
*B05D 7/14*    (2006.01)
*C09D 5/08*    (2006.01)

(52) U.S. Cl.
CPC *C09D 5/088* (2013.01); *B05D 7/14* (2013.01); *B05D 7/142* (2013.01)
USPC .......................................... 427/327; 427/435

(58) Field of Classification Search
CPC .................................. B05D 7/14; B05D 7/142
USPC ................................................ 427/430.1, 435
See application file for complete search history.

(56) References Cited

U.S. PATENT DOCUMENTS

| | | | | |
|---|---|---|---|---|
| 4,313,861 A | * | 2/1982 | Bassett et al. | 524/558 |
| 4,562,098 A | | 12/1985 | Ahmed | |
| 4,647,480 A | | 3/1987 | Ahmed | |
| 4,657,788 A | * | 4/1987 | Benton et al. | 427/354 |
| 4,758,621 A | | 7/1988 | Broadbent | |
| 4,800,106 A | * | 1/1989 | Broadbent | 427/388.1 |
| 4,994,521 A | | 2/1991 | Broadbent | |
| 5,342,694 A | * | 8/1994 | Ahmed et al. | 428/461 |
| 5,352,726 A | * | 10/1994 | Hall | 524/435 |
| 5,427,863 A | * | 6/1995 | Siebert | 428/463 |
| 5,691,048 A | | 11/1997 | Roberto et al. | |
| 5,912,297 A | | 6/1999 | Hall et al. | |
| 6,224,947 B1 | | 5/2001 | Hall et al. | |
| 6,312,820 B1 | | 11/2001 | Hall | |

FOREIGN PATENT DOCUMENTS

| | | |
|---|---|---|
| EP | 32297 A2 * | 7/1981 |
| RU | 2089583 | 9/1997 |
| RU | 2089583 C1 * | 9/1997 |

\* cited by examiner

*Primary Examiner* — David Turocy
(74) *Attorney, Agent, or Firm* — Lynn B. Morreale

(57) ABSTRACT

Embodiments of the present disclosure include processes for autodepositing a coating on a metal surface, a method of producing a coating on a non-stainless steel metal substrate surface, and an alkaline coating composition, where the process for autodepositing a coating on a metal substrate surface includes immersing at least a portion of the metal substrate surface in a coating composition that includes a latex and an amount of base sufficient to raise the pH of the composition to an alkaline pH, where the coating autodeposits on the metal substrate surface, as metal ions from the metal substrate surface interact with the alkaline coating composition.

11 Claims, 10 Drawing Sheets

ALKALINE COATING COMPOSITION FOR AUTODEPOSITION

TECHNICAL FIELD

Embodiments of the present disclosure relate to coating compositions which are effective in forming a coating on a substrate. More specifically, embodiments of the present disclosure relate to an alkaline coating composition of the type which is effective in forming a coating on metal.

BACKGROUND

Autodeposition, also referred to as chemiphoresis, autophoresis, and/or autophoretic deposition, is an aqueous immersion process for coating metal that is driven by reactions between the coating and the metal substrate surface when small amounts of multivalent metal ions are slightly solubilized and released from the metal surface leading to destabilization and deposition of the composition at the surface. The aqueous composition for coating the metal can contain a polymer dispersion. For example, one feature of an autodepositable coating can be that the dispersed material is stabilized by functional groups on the polymer and/or provided by surface active agents which are sensitive to multivalent ions entering the aqueous phase. Deposition can occur by interaction between the multivalent ions and the functional groups, causing the dispersion to precipitate on the surface when sufficient concentration of multivalent ions occurs at the metal surface. The multivalent ions can also crosslink the dispersion particles via reaction with particle surface carboxyl groups and/or with other functional surface groups and with the metal substrate.

Examples of autodepositing compositions are disclosed, for example, in European Patent Publication 0132828, Bashir M. Ahmed, U.S. Pat. No. 4,647,480, and Wilbur S. Hall, U.S. Pat. Nos. 5,691,048, and 4,657,788, and patents cited therein. Such compositions can be designed to be particularly effective when a resin material is provided in the form of a dispersed polymer such as a sulfonate-functionalized novolak, or latex made from the emulsion polymerized product of, for example, at least two polymerizable ethylenically unsaturated monomers.

SUMMARY

The present disclosure provides a process for autodepositing a coating on a metal substrate surface, a method of producing a coating on a non-stainless steel metal substrate surface, and an alkaline coating composition. The coating composition includes a latex and an amount of base sufficient to raise the pH of the coating composition to an alkaline pH. The process includes immersing at least a portion of the metal substrate surface in the coating composition, where the coating autodeposits on the metal substrate surface, as metal ions from the metal substrate surface react with and destabilize the alkaline coating composition. In some embodiments, the deposition of the latex can continue until the coating has a thickness of at least about ¼ inches (0.635 centimeters).

For the various embodiments, the pH can be in a range of about 7.1 to about 12, preferably about 9.5 to about 11.5. In some embodiments, the autodeposition rate can be dependent on the pH of the coating composition. Also, the base used to raise the pH of the coating composition can be selected from a group including ammonia, sodium hydroxide, potassium hydroxide, barium hydroxide, cesium hydroxide, calcium hydroxide, lithium hydroxide, tetramethyl ammonium hydroxide, tetraethylammonium hydroxide, an amine, and any mixture thereof.

In various embodiments, latexes of the present disclosure can include unpigmented latexes, pigmented latex paints, and/or fast-hardening traffic latex paints. In addition, the non-stainless steel metal surface for deposition can be selected from a group consisting of copper, bronze, zinc, iron, aluminum, zinc plated steel, hot dip galvanized steel, and alloys thereof.

In various embodiments of the present disclosure, the coating composition can include a polyimine or a polyamine.

In some embodiments, the coating on the metal surface can increase in weight and/or thickness the longer the metal surface is immersed in the coating composition.

In some embodiments, the latex autodeposited on the substrate surface retains about all the water that is originally in the latex or aqueous composition. In such embodiments, the ions can migrate through the water phase to continue autodeposition of the latex on the substrate.

In various embodiments, the aqueous coating composition can include a latex having a $T_g$ greater than about 40 degrees Celsius to produce a ceramic-like coating on the non-stainless steel metal substrate surface. In various embodiments, the aqueous coating composition can include a latex having a $T_g$ in a range of about −70 degrees Celsius to about 25 degrees Celsius. The coatings can be used to coat rebar, bolt threads, wires, automotive bodies and automotive body parts, and industrial metal, among others. The coating compositions can be used to coat the wires and/or threads, provide industrial metal finishes, insulate metal, provide a sound dampening coating on metal, and/or provide a thick, intumescent coating on metal, among other uses.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list unless explicitly stated as such.

Definitions

As used herein, "a," "an," "the," "at least one," and "one or more" are used interchangeably. The terms "comprises," "includes," and variations thereof do not have a limiting meaning where these terms appear in the description and claims. Thus, for example, an alkaline coating composition that includes "a" latex and "a" base can be interpreted to mean that the alkaline coating composition includes "one or more" latexes and/or "one or more" bases.

As used herein, the term "and/or" means one or all of the listed elements.

As used herein, the term "dry" means in the substantial absence of water and the term "dry basis" refers to the weight of a dry material.

As used herein, the term "room temperature" means 20-25° C.

For the purposes of the present disclosure, the term "copolymer" means a polymer derived from more than one species of monomer.

As used herein, "$T_g$" is an abbreviation for glass transition temperature.

As used herein "ml" is an abbreviation for milliliter(s).

As used herein "mm" is an abbreviation for millimeter(s).

As used herein "mil" is an abbreviation for a unit of length equal to 1/1000 of an inch.

As used herein "° C." is an abbreviation for degrees Celsius.

As used herein "g" is an abbreviation for gram(s).

As used herein, the term "metal substrate surface" refers to the surface where a coating is autodeposited. As used herein, the terms "metal surface," "metal substrate," "substrate," and "metal substrate surface," refer to the metal and/or the metal surface where a coating is autodeposited.

Also herein, the recitations of numerical ranges by endpoints include all numbers subsumed within that range (e.g., 1 to 5 includes 1, 1.5, 2, 2.75, 3, 3.80, 4, 5, etc.).

DETAILED DESCRIPTION

Figure 1:
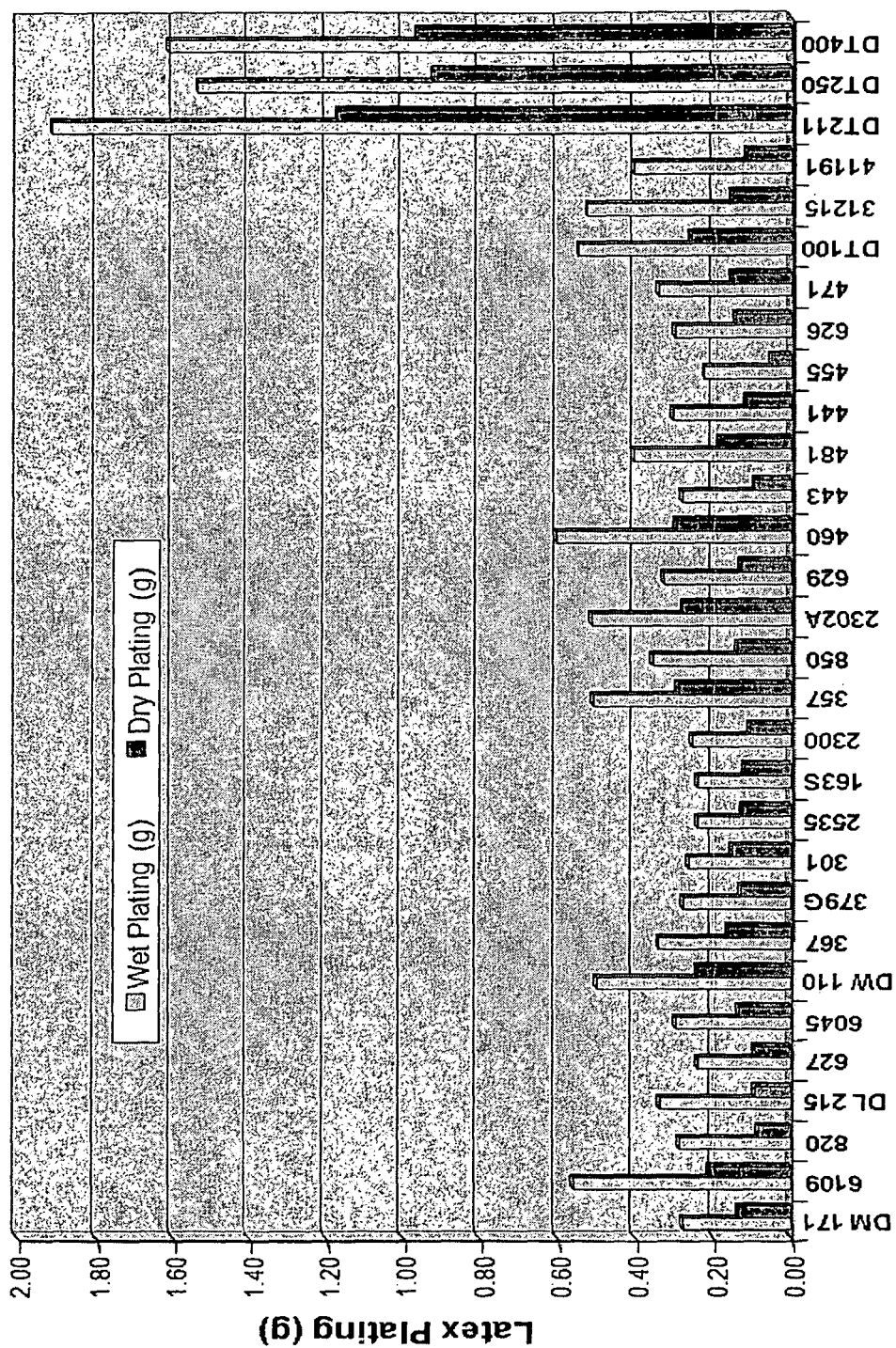
FIG. 1 is a graph illustrating the wet plating and dry plating amounts on zinc plated steel for several different coating compositions.

Embodiments of the present disclosure include coating compositions including a latex and an amount of base sufficient to raise the pH of the composition to an alkaline pH. Embodiments of the present disclosure also include processes for applying the coating composition and methods for producing a coating on a metal substrate surface including immersing at least a portion of the metal substrate surface in the coating composition, where the coating autodeposits on the metal substrate surface, as metal ions from the metal substrate surface interact with the alkaline coating composition.

The process of applying a coating composition to a metal substrate surface provides for thick or thin film deposition of latex paints or coatings and/or fast-hardening traffic latexes, where the thickness of the coating deposited on the substrate is dependent on the time the substrate is immersed in the coating composition. For example, the deposition of the dispersed latex can continue until the coating has a thickness of at least about ¼ inch (0.635 centimeter). However, very thick coatings of up to ½ inch (1.27 centimeters) or more are possible.

Embodiments of the present disclosure differ from commercial autodeposition of latex binders and paints in that the coating composition of the present disclosure is at an alkaline pH. In commercial autodeposition, latex binders and paints are at low pH often with the addition of hydrofluoric acid (HF) and/or an oxidizing agent, such as hydrogen peroxide ($H_2O_2$). During the coating process, metal of the substrate being coated is dissolved by the acidic composition. For example, when coating an iron or steel article with a composition containing HF and $H_2O_2$, iron is dissolved from the substrate and then oxidized from ferrous iron to ferric iron. The ferric iron can then interact with functional groups on the polymer in the latex causing the latex to precipitate to form a coating.

However, commercial autodeposition using acidic polymer latexes can include various limitations. For example, a coating can form on a metallic surface whose thickness is the same regardless of the time the surface is contacted with the composition. In other words, the coating process shuts down, preventing any further film build. In such instances, in order to obtain thicker coatings, the metallic surface can be subjected to multiple stage coating operations, or the solids content of the composition can be increased.

Embodiments of the present disclosure, on the other hand, include coating compositions and methods of autodepositing coatings on metal surfaces using a coating composition at an alkaline pH without the addition of special additives, such as an oxidizing agent, and/or hazardous materials such as HF. As discussed herein, in such embodiments, the thickness of the coating can be a direct function of the time the metal surface is immersed in the coating composition. In other words, the coating composition of the present disclosure provides a coating process using autodeposition that does not shut down after a certain period of time.

In embodiments of the present disclosure, the coating composition includes a latex and a base. The base can raise the pH of the coating composition to an alkaline pH. Not wishing to be bound by theory, the base included in the coating composition can dissolve metal ions from the metal substrate surface to react with the latex, or portions of the latex, to cause autodeposition of the coating on the metal substrate surface. Since at least a portion of the metal substrate surface is immersed in the coating composition, the liquid level stays the same during the autodeposition, as well as the pH level. The metal ions can continue to diffuse from the metal substrate surface through water in the coating composition, creating an autodeposition process that is time dependent, thus creating thick coatings of up to at least ¼ inch, as discussed herein.

In some embodiments, the coating formed on the metal substrate surface can have a porous, honeycomb-type structure. In such embodiments, the base in the coating composition can continue to reach the metal substrate surface to release metal ions into the coating composition, improving the likelihood that a thick coating is applied on the metal substrate surface.

In some embodiments, the process of autodepositing the coating composition on a metal substrate surface can include applying an ultrathin film. As used herein, an "ultrathin film" refers to a coating having a molecular thickness. In such embodiments, the metal substrate surface can be immersed in the coating composition for less than about 5 seconds. In various embodiments, a thin coating having a thickness in a range of about 1 micron to about 10 microns can be produced on a metal substrate surface when the metal substrate surface is immersed in the coating composition for about one minute.

As discussed herein, coating compositions of the present disclosure include a latex and a base. As used herein, "latex" refers to a dispersion of a water-insoluble polymer which may be prepared by conventional polymerization techniques such as, for example, emulsion polymerization. As used herein, "glass transition temperature" or "$T_g$" refers to the narrow temperature range over which amorphous polymers change from being relatively hard and brittle to relatively soft and viscous (rubbery).

The latex included in the coating composition of the present disclosure can have a monomodal or polymodal (e.g., bimodal) particle size distribution. In addition, the latex can be an unpigmented latex or a pigmented latex. The latex composition can also have other components present, such as pigment dispersants, surfactants, biocides, and the like. Further, the latex can be a fast-hardening traffic latex paint. Latexes used in fast dry applications are well known to those skilled in the art, and many of such latexes are commercially available. Mixtures and/or blends of latexes can also be employed.

Embodiments of the present disclosure include latexes including homopolymers and/or copolymers. In addition, the latex may contain a single copolymer or more than one copolymer. Exemplary monomers to form a polymer and/or copolymer can include ethylenically unsaturated monomers including styrene; butadiene; acrylate; alkyl-substituted acrylates such as methyl methacrylate and ethyl methacrylate; vinyl halides such as vinyl chloride; vinylidene halides such as vinylidene chloride and vinylidene dichloride; alkylenes such as ethylene; halide-substituted alkylenes such as tetrafluoroethylene; acrylonitriles such as acrylonitrile, and vinyl ester monomers such as vinyl acetate, vinyl propionate, and vinyl neodecanoate, combinations thereof, and the like.

As discussed herein, in some embodiments, the latex can be a fast-hardening traffic latex paint. In some embodiments, the polymer of the fast-hardening traffic latex can be a copolymer. A wide variety of monomers may be used to prepare copolymers of the fast-hardening traffic latex paint. For example, (meth)acrylate copolymers including primarily (meth)acrylate monomers are one type of copolymer.

As used herein, the term "(meth)" indicates that the methyl substituted compound is included in the class of compounds modified by that term. For example, the term (meth)acrylic acid represents acrylic acid and methacrylic acid.

Examples of suitable (meth)acrylates include methyl acrylate, ethyl acrylate, butyl acrylate, hexyl acrylate, 2-ethylhexyl acrylate, octyl acrylate and isooctyl acrylate, n-decyl acrylate, isodecyl acrylate, tert-butyl acrylate, methyl methacrylate, butyl methacrylate, hexyl methacrylate, isobutyl methacrylate, isopropyl methacrylate as well as 2-hydroxyethyl acrylate and acrylamide. The preferred (meth)acrylates are methyl acrylate, ethyl acrylate, butyl acrylate, 2-ethylhexyl acrylate, octyl acrylate, isooctyl acrylate, methyl methacrylate, and butyl methacrylate.

Other suitable monomers include lower alkyl acrylates and methacrylates including acrylic and methacrylic ester monomers: methyl acrylate, ethyl acrylate, n-butyl acrylate, t-butyl acrylate, 2-ethylhexyl acrylate, decyl acrylate, isobornyl acrylate, methyl methacrylate, ethyl methacrylate, n-propyl methacrylate, isopropyl methacrylate, n-butyl methacrylate, isobutyl methacrylate, sec-butyl methacrylate, cyclohexyl methacrylate, isodecyl methacrylate, isobornyl methacrylate, t-butylaminoethyl methacrylate, stearyl methacrylate, glycidyl methacrylate, dicyclopentenyl methacrylate, and phenyl methacrylate.

In some embodiments, the fast-hardening traffic latex paint can include an amine-containing latex. As used herein, "amine-containing" latex refers to a latex having pendant amine functional groups. The amine-containing latexes may be prepared in accordance with any of a number of methods, including, but not limited to: addition polymerization of ethylenically unsaturated monomers containing amine-functionality; polymerization of monomers which readily generate amines by hydrolysis; reactions of aziridines with carboxyl-containing polymers; reactions of polymers containing an enolic carbonyl group (e.g., acetoacetoxyethyl methacrylate (AAEM), and diamines); reactions of amines with epoxy-containing polymers; and reactions of amine with polymers of vinyl benzyl chloride. Such polymerization reactions are known in the art, and examples of preparation of these and other suitable amine-containing latexes may be found in the following publications: U.S. Pat. No. 3,847,857 (Chou et al.); U.S. Pat. No. 4,119,600 (Bakule et al.); U.S. Pat. No. 5,364,891 (Pears et al.); U.S. Pat. No. 5,494,961 (Lavoie et al.); and U.S. Pat. No. 4,367,298.

Exemplary fast-hardening traffic latexes that can be included in the coating compositions of the present disclosure include Dow DT211, Dow DT 250, Dow DT 400, commercially available from The Dow Chemical Company, and Fastrack 2706, commercially available from Rohm and Haas Company.

The amount of latex in the coating composition can vary depending on the type of latex and other coating ingredients. For example, in some embodiments, the latex concentration in the coating composition can be greater than one weight percent of the total composition. In various embodiments, the latex concentration is greater than ten percent of the total composition. In addition, in unpigmented latex compositions, the latex solids content can be as high as 60 percent or more.

In some embodiments, the polymer of the latex can be chosen based on the desired characteristics of the coating on the metal surface. For example, to obtain a hard, or ceramic-like coating on the metal substrate surface, the latex polymer can have a $T_g$ of greater than about 40 degrees Celsius. As appreciated by one skilled in the art, "hardness" refers to the resistance of a material to plastic deformation by indentation. The hardness of a surface can be determined by forcing an indenter such as a Vickers or Knoop indenter into a surface of the material under 15 to 1,000 gram force (gf) load. For the Knoop indenter, the hardness value is given by the formula:

$$HK = \frac{\text{load (kilogram force } (kgf))}{\text{impression area (square millimeters(mm}^2))} = \frac{P}{C_p L}$$

where:
L=length of indentation along its long axis
$C_p$=correction factor related to the shape of the indenter
P=load In embodiments of the present disclosure, the term "ceramic-like" refers to coatings that have a HK in a range of 100 to 500. In other words, the term "ceramic-like" refers to a coating that cannot be indented with a fingernail, and also exhibits a "clinking" sound when tapped against a metal surface. One example of a latex with a $T_g$ greater than about 40 degrees Celsius is NeoCAR Acrylate 850, with a $T_g$ of 50 degrees Celsius, available commercially from The Dow Chemical Company. In another embodiment, a hard, or ceramic-like, coating on the metal substrate surface can be obtained using a latex polymer with a $T_g$ greater than about 10 degrees Celsius and an inorganic pigment volume concentration greater than about 50 percent, as might be typical of a flat paint coating formulation. In some embodiments, the inorganic pigment volume concentration in the latex can be greater than 80 percent.

On the other hand, to obtain a soft and/or tacky coating on the metal substrate surface, the latex polymer can have a $T_g$ in a range of about −70 degrees Celsius to about 10 degrees Celsius. Exemplary latexes include Dow 300 with a $T_g$ of 5 degrees Celsius and Dow 123 with a $T_g$ of −17 degrees Celsius, among others. The $T_g$ of the polymer included in the latex of the coating composition of this disclosure is determined by differential scanning calorimetry (DSC).

Suitable latexes can be produced using conventional emulsion polymerization techniques. Thus, for example, the monomers to be employed in the particular latex involved are typically dispersed, with agitation sufficient to emulsify the mixture, in an aqueous medium that may contain known emulsifying agents such as surfactants as well as other ingredients employed in the art as polymerization aids, including chain transfer agents. Such monomers are then subjected to polymerization with the aid of a source for generating free radicals, including free radical polymerization catalysts, activating radiation, or other means.

Free radical polymerization catalysts suitable for use in the foregoing polymerizations include those already known to promote emulsion polymerization. Among such catalysts are oxidizing agents such as organic peroxides such as t-butyl hydroperoxide and cumene hydroperoxide inorganic oxidizing agents such as hydrogen peroxide, potassium persulfate, sodium persulfate, ammonium persulfate and catalysts that, like redox catalysts, are activated in the water phase, for example, by a water-soluble reducing agent.

Such catalysts are employed in an amount sufficient to cause polymerization, that is, in a catalytic amount. As a general rule, an amount ranging from about 0.01 to about 5 weight percent based upon the total monomer to be polymerized is sufficient. Alternatively, other free radical producing means, such as exposure to activating radiations, can be employed rather than heat and/or catalytic compounds to activate the polymerization.

Suitable emulsifying agents that can be employed include the anionic and nonionic emulsifiers customarily used in emulsion polymerization. Usually at least one anionic emulsifier is included and one or more nonionic emulsifiers can also be present. Representative types of anionic emulsifiers are the alkyl aryl sulfonates, alkali, metal alkyl sulfates, the sulfonate alkyl esters, the fatty acid soaps, and the like. Specific examples of those well-known emulsifiers include dodecylbenzene sodium sulfonate, sodium butylnaphthalene sulfonate, sodium lauryl sulfate, disodium dodecyl diphenyl ether disulfonate, N-octadecyl disodium sulfosuccinate, and dioctyl sodium sulfosuccinate, and, preferably, the corresponding ammonium salt forms. Such emulsifying agents can be employed in varying amounts so long as adequate emulsification is achieved to provide dispersed polymer particles having the desired particle size and particle size distribution. However, as a general rule, an amount ranging from about 0.01 to about 5 weight percent, based upon the total monomer to be polymerized is advantageously employed.

Conventional chain transfer agents can also be employed in the production of latexes and, indeed, in polymerization stages employing an aliphatic conjugated diene, it is preferable to do so. Examples include long chain mercaptans, for example, lauryl mercaptan, dodecyl mercaptan, and other known chain transfer agents.

Other ingredients known in the art to be useful for various specific purposes in emulsion polymerization can also be employed in the aforementioned latexes, for example, when the polymerizable constituents for a given latex include a monoethylenically unsaturated carboxylic acid monomer, polymerization under acidic conditions, that is the aqueous media having pH value of from about 2 to 7, especially from about 2 to about 5, is preferred. In such instances, the aqueous medium can include acids and/or salts to provide the desired pH value and possibly a buffered system.

The latexes can be prepared by emulsion polymerization techniques that are well known in the art. For example, in some embodiments, water and a seed latex, and/or a micelle-forming surfactant are introduced into a reactor equipped with pumps to deliver monomer and aqueous feeds. The reactor is purged with nitrogen and heated. Over a period of several hours, the monomer streams are added as well as a stream containing water, aqueous surfactant, and polymerization initiator. Following the addition of the monomer streams and the aqueous streams, the reaction mixture is maintained at the reaction temperature for additional reaction time to ensure extensive reaction before cooling. The latex then may be steam distilled to reduce the concentration of unreacted monomers.

Numerous other copolymers and copolymer-containing latexes can be utilized in the composition of the instant invention, for example, as disclosed in U.S. Pat. Nos. 6,075,079; 5,201,948; 5,213,901; 5,198,492; 5,185,396; 5,182,327; 5,173,534; 5,212,251; 5,059,456; 4,293,476; 4,666,777; 4,658,003; 4,742,108; 4,644,032; 4,623,678; 4,087,572; 4,012,355; 5,236,991; 5,157,084; 5,045,576; 4,973,670; 4,972,018; 4,968,740; 4,962,154; 4,863,979; 4,857,631; 4,806,207; 4,508,869; 4,733,005; and 4,707,221.

As discussed herein, coating compositions of the present disclosure include a latex and a base to raise the pH of the composition to an alkaline pH, producing an alkaline coating composition. In some embodiments, the base can be selected from a group including ammonia, sodium hydroxide, potassium hydroxide, barium hydroxide, cesium hydroxide, calcium hydroxide, lithium hydroxide, tetramethyl ammonium hydroxide, tetraethylammonium hydroxide, an amine, and any mixture thereof. In addition, in some embodiments, the amine containing base can be selected from a group consisting of dimethylamine, diethylamine, aminopropanol, 2-amino-2-methyl-1-propanol, methylamine, propylamine, 2-propyl amine, and any mixture thereof.

In some embodiments, the base can be added to the coating composition to raise the pH of the composition to a pH in a range of about 7.1 to about 12. More preferably, the base can be added to the coating composition to raise the pH of the composition to a pH in a range of about 9.5 to about 11.5. In some embodiments, raising the pH of the coating composition increases the autodeposition rate of the coating composition on the metal substrate surface. In other words, a thicker coating can be applied in a shorter period of time when the coating composition has a higher pH, for example, when the coating composition has a pH in the range of about 9.5 to about 11.5.

In some embodiments, the coating composition can include a polyimine or polyamine. Polyamines are polymers produced by the polymerization of amine monomers or by hydrolysis of polymers to amine functionality. Similarly, polyimines are polymers produced by the polymerization of imine monomers that do not contain carbon-carbon ethylenic unsaturation, but, rather, contain either carbon-nitrogen unsaturation or exist as heterocyclic ring compounds. As a result, polyimines have nitrogen atoms in the polymer backbone. The polyimines may be linear or branched and may contain primary, secondary, and/or tertiary amines and/or along the polymer backbone. Depending upon the pH of the system, these nitrogen atoms may be protonated.

In some embodiments, the polyimine or polyamine can be employed in an amount sufficient to result in a fast-hardening traffic latex, as discussed herein. As will be appreciated, fast-hardening traffic latexes and the traffic paints made from them are commonly referred to as "fast-dry latexes" and "fast-dry paints," respectively. Although the fast-hardening traffic latexes appear to dry very rapidly after a coating is applied, the film actually continues to contain significant water content even though the surface feels dry to the touch. In one embodiment, the amount of polyimine or polyamine employed is from about 0.2 to about 5 weight parts, based on 100 weight parts of latex solids, preferably is from about 0.3 to 3 parts, and more preferably is from about 0.5 to about 2 parts, based on 100 weight parts of latex solids.

Suitable polyimines or polyamines for use in the coating composition of the present disclosure include, for example, polyethylenimines and polypropylenimines, desirably with a molecular weight of at least about 250 grams per mole (g/mol), preferably with a molecular weight of at least about 400 g/mol, more preferably with a molecular weight of at least about 700 g/mol. Preferred polyimines or polyamines for use in the coating composition of the present disclosure include polyethylenimine (PEI) that has an average molecular weight of about 2,000 g/mol. The material is available from BASF as LUPASOL G-35, CAS No. 9002-98-6. Other commercially available PEI's include LUPASOL FG with an average molecular weight of about 800 g/mol, and LUPASOL G-20 with a molecular weight of about 1,300 g/mol. Low molecular weight PEI is also available from Nippon Shokubai as CAS No. 106899-94-9 including EPOMIN SP-300 with an average molecular weight of about 300 g/mol, EPOMIN SP-012 with an average molecular weight of about 1,200 g/mol, and EPOMIN SP-018 with an average molecular weight of about 1,800 g/mol. In addition, high molecular weight PEI is available from Nippon Shokubai as CAS No. 9002-98-6 including EPOMIN SP-200 with an average molecular weight of about 10,000 g/mol and EPOMIN P-1000 with an average molecular weight of about 70,000 g/mol. The molecular weights of the PEI's are been determined by light scattering techniques.

If desired, one or more additives may be incorporated into the coating compositions of the present disclosure in order to modify the properties thereof. Examples of these additives include conventional thickeners, dispersants, pigments, dyes and/or colorants, biocides, anti-foaming agents, optical brighteners, wet strength agents, lubricants, water retention agents, flame retardants, antioxidants, UV stabilizers, crosslinking agents, surfactants, buffering agents, and the like.

As discussed herein, the process of autodepositing the coating on the metal substrate surface includes immersing at least a portion of the metal substrate surface in the coating composition, where the coating autodeposits on the metal substrate surface, as metal ions from the metal substrate surface react with the alkaline coating composition. In some embodiments, the metal substrate surface is a non-stainless steel metal. In various embodiments, the non-stainless steel metal can be selected from a group consisting of: copper, bronze, iron, zinc, aluminum, zinc plated steel, hot dip galvanized steel, and alloys thereof.

Steels are designated by grade, type, and class. Grade is used to denote chemical composition; type is used to indicate deoxidation practice; and class is used to describe some other attribute such as strength level or surface smoothness. ASTM or ASME are the most widely used specifications for steel products in the United States; however, the grade, type, and class terms are used somewhat interchangeably. Stainless steel is known for its outstanding corrosion resistance and is primarily an alloy of iron, chrome, and nickel with very low carbon content. 18-8 is a generic designation that is used to indicate stainless steels such as 302, 303, 304, 305, 384 having compositions containing approximately 18 percent chrome and 8 percent nickel. 316 stainless steel is often the metal of choice for aqueous contact and is composed of 67.9 percent iron (Fe), 17 percent cromium (Cr), 12 percent nickel (Ni), 3.0 percent molybdenum (Mo), and 0.10 percent carbon (C) by weight. Carbon steels have lower corrosion resistance than stainless with carbon contents in the range of about 0.3-1.1 percent. They also contain less than 1.65 percent manganese (Mn), 0.60 percent silicon (Si), and 0.60 percent copper (Cu) while alloy steels have greater levels of those three elements. Contrasted to these are wrought iron that contains 98.5 percent Fe with 1.5 percent C, and cast iron is with 97 percent Fe with 3 percent carbon. Almost all carbon steel that is exposed to the external environment is either zinc plated or hot dip galvanized (also a zinc coating). Common grades of carbon steel that are zinc plated are Steel Grade 2 (low carbon steel), Steel Grade 5 (medium carbon steel) and Steel Grade 8 (medium carbon alloy steel). Because galvanized steel has a much thicker coating than zinc plated steel, galvanized steel is also more corrosion resistant.

Brass and bronze are alloys of copper, but they also contain some zinc. A typical yellow brass composition is 67 percent Cu and 33 percent zinc (Zn), while naval brass is 60 percent Cu, 39 percent Zn and 1% tin (Sn). Bronze is often used in marine applications and has greater strength and more corrosion resistance than brass. A typical salt water bronze composition is 45 percent Cu, 33 percent Ni, 16 percent Sn, and 5.5 percent Zn.

In some embodiments, the coating compositions of the present disclosure can apply a coating on metal and/or non-stainless steel metal articles including reinforcing bar, bolt threads, wires, automotive bodies and automotive body parts, and industrial metal, among others. The coating applied using the coating composition of the present disclosure can be used to, for example, coat the wires, provide industrial metal finishes, insulate metal, create a sound dampening coating on metal, and/or create a thick, intumescent coating on metal. Other uses for the coating are also possible.

As discussed herein, in some embodiments, the coating composition can form a coating on a metal surface with a honeycomb-like structure. In some industrial applications, the honeycomb-like structure of the coating can allow other materials into the coating to strengthen the bond between the coating and the material. For example, the coating composition can be used to coat reinforcing bar which can then be used with concrete, where the concrete can enter the honeycomb-like structure of the coating on the reinforcing bar before the concrete sets into a solid phase, creating a stronger bond between the concrete and the coating on the reinforcing bar as compared to uncoated reinforcing bar.

While the present disclosure has been shown and described in detail above, it will be clear to the person skilled in the art that changes and modifications may be made without departing from the spirit and scope of the disclosure. As such, that which is set forth in the foregoing description and accompanying drawings is offered by way of illustration only and not as a limitation. The actual scope of the disclosure is intended to be defined by the following claims, along with the full range of equivalents to which such claims are entitled.

In addition, one of ordinary skill in the art will appreciate upon reading and understanding this disclosure that other variations for the disclosure described herein can be included within the scope of the present disclosure.

The following examples are provided for illustrative purposes and are not intended to limit the scope of the disclosure since the scope of the present disclosure is limited only by the appended claims and equivalents thereof. All parts and percentages are by weight unless otherwise indicated.

SPECIFIC EMBODIMENTS

The following examples are given to illustrate embodiments of the present disclosure and should not be construed as limiting in scope. All parts and percentages are by weight unless otherwise indicated.

Test Methods pH pH is measured on latexes and paints at room temperature using a Cole Farmer pH 100 Series pH meter with autotemperature compensation.

Autodeposition

Commercial bolts or lag screws are used for the test metal substrates. They are a preferred test metal substrate because they have a large surface area per unit volume, are uniform in size and geometry, are easy to obtain, are low cost, require no preparation, have a threaded geometry, have geometry and size that allow small volumes of sample liquid for the test, and are available in a variety of metal types in a given geometry. Common threaded bolts and lag screws of 2 inches (2") length and ¼" diameter are the standard test geometry. Full thread hex head tap bolts of zinc plated steel, hot dip galvanized steel, and solid bronze construction are used for most metal stability testing. As brass is not commonly available in a hex head configuration, full thread solid brass machine screws with slotted pan or flat heads are employed. The shaft of the brass machine screw is identical to the hex head bolts of the same diameter. The 2" tap bolts and machine screws have standard threads of 20 threads/in for ¼" diameter. The common designation for this geometry is ¼20×2. Hex head lag bolts (often referred to as lag screws) of zinc steel and galvanized steel construction are also used for metal testing, and these are a preferred geometry for these metals. The 2" hex head lag screws of ¼" in diameter have threads that are wider (10 threads/in) and deeper than tap bolts. Unlike bolts, which have a relatively flat end, lag screws have a pointed end and are designed for anchoring into wood substrates.

The test cells for containing the test metals are glass 20 milliliter (ml) disposable scintillation vials with plastic caps. These cells are employed because they are large enough to contain the 2" test metals when capped, easy to seal, transparent, low in cost, inert, and readily available. The dimensions of these scintillation vials are 60 millimeters (mm) in height and 24 mm internal diameter (ID) with a neck opening of 16 mm. Although these vials hold 20 ml when full, only 15 ml of liquid sample is used for each test for partial immersion of the bolts to a depth of 32 mm. With 15 ml of liquid sample in the scintillation vial, the immersion depth of a ¼" (~6 mm) diameter bolt or screw is 32 mm. The bolt extends about 28 mm above the surface of the liquid with the head of the bolt or screw at the top residing just inside the vial neck for positioning and ease of removal.

The following is a detailed procedure for this method. All weighings are with an analytical balance to four decimal places.

1. Number and weigh ($W_{M1}$) a series of bolts or lag screws. The test metals are all from the same supplier and same lot for a given test series.
2. Inject 15.0 ml of latex or paint into each vial by syringe, and then cap the vial.
3. Weigh ($W_{VL1}$) each capped vial containing the 15 ml of latex or latex paint.
4. Place a matching numbered bolt or lag screw into each vial containing the latex or paint with the head up and the threaded end down. Recap the vial.
5. Allow the samples to sit undisturbed for the specified immersion time. The standard period is 24 hours (hr).
6. At the end of the immersion period, carefully remove each bolt or lag screw with tweezers avoiding contact with the neck or sides of the vial. Let any free latex drip back into the vial (usually only 1-3 drops), and then place the head of each bolt into a notched metal rack for drying. Recap the vial.
7. Weigh ($W_{VL2}$) each capped vial containing the remaining uncoated latex or paint to determine the "Wet Coating" ($C_W$), where $C_W = W_{VL1} - W_{VL2}$.
8. After air drying the coated bolts for 1 hr, place the metal rack containing the bolts into an air circulating oven at 120° C. for 2 hr. Remove the metal rack from the oven, and allow the samples to cool to room temperature (~15 min).
9. Weigh ($W_{M2}$) each coated bolt and then calculate "Dry Plating" ($C_D$), where $C_D = W_{M2} - W_{M1}$.

Dividing the Dry Coating ($C_D$) by the Wet Coating ($C_W$) gives the average "Coating solids" ($C_S$), where $C_S = (C_D/C_W) \times 100$.

For coated paint samples, the bolts or screws are gently rinsed with deionized water immediately after removal from the vials. In this procedure, the bolt is removed from the cell with tweezers and then immersed in a container of deionized water. The bolt is gently swirled in the container three times and then removed and placed in a drying rack. This procedure removes any free paint that is not really coated. Latex or paint that is truly coated on metal becomes water insoluble and remains on the threads during rinsing.

As used herein, the coating on the metal substrate surfaces is referred to as "plating." For example, the amount of latex coated onto a metal substrate surface will have a "wet plating" amount and a "dry plating amount" which refers to the weight of the coating on the metal substrate surface when the coating is wet and when the coating is dry, respectively.

Materials

The following materials are used in the examples.

Latexes: UCAR™ Latexes DT211, DT250, DT400, DM 171, 6109, DL 215, 627, 6045, DW 110, 367, 379G, 301, 163S, 2300, 357, 629, 460, 443, 481, 441, 455, 626, 471, DT100, 300, 123, 9165, 3427, 657, 435, DM166, and 379G; NEOCAR™ Acrylic Latexes 820 and 850; NEOCAR™ Latexes 2535, 2302A, and 2300; Dow Latexes 31215 and 41191; and EVOCAR Latexes DA280 (available from The Dow Chemical Company, Midland Mich., USA)

Cells: 20 ml scintillation vials with caps

Latex or Latex Paint: 15.0 ml in each vial

Metal Substrates: 2 inch bolts or screws of ¼ inch diameter

Paint Formula Methanol-Free White Traffic Paint, Formulation Suggestion V-2212, UCAR latex DT250 product bulletin, Form No. 309-00368-0903NA

Example 1

A 2 inch zinc plated steel lag screw is placed in a vial containing 15 ml of UCAR latex DT250. After 24 hours the bolt is removed and two to three drops of unplated wet latex is allowed to drip back into the vial before placing the bolt in a drying rack. The wet plating on the bolt is 2.5 grams (g). The dry plating after drying 2 hours at 120° C. is 1.5 g.

Example 2

A 2 inch brass tap bolt is placed in a vial containing 15 ml of UCAR latex DT250. After 24 hours the bolt is removed as provided in Example 1. The wet plating on the bolt is 1.8 g. The dry plating after drying 2 hours at 120° C. is 1.1 g.

Example 3

A 2 inch zinc plated steel lag screw is placed in a vial containing 28 g of white traffic paint prepared from using the Methanol-Free White Traffic Paint Formulation V-2212. After 24 hours the bolt is removed and rinsed. The wet plating on the bolt is 8.2 g. The dry plating after drying 2 hours at 120° C. is 6.4 g.

Example 4

Into separate vials are placed 15 ml each of thirty different commercial latexes. A 2 inch zinc plated steel lag screws is then placed into each vial. The variety of commercial latexes include: UCAR™ Latexes DM 171, 6109, DL 215, 627, 6045, DW 110, 367, 379G, 301, 163S, 2300, 357, 629, 460, 443, 481, 441, 455, 626, 471, DT100, DT211, DT250, DT400; NEOCAR Acrylic Latexes 820 and 850; NEOCAR Latexes 2535 and 2302A; and Dow Latexes 31215 and 41191, available commercially from The Dow Chemical Company. The pH range for the latexes ranges from below 6 to above 10. After 24 hours the bolt is removed as provided in Example 1. The wet plating and dry plating after drying 2 hours at 120° C. is shown in FIG. 1.

As shown in FIG. 1, the latexes DT211, DT250, and DT400 have the highest amount of plating.

Example 5

Into separate vials are placed 15 ml each of a variety of commercial latexes. A metal substrate is then placed into each vial. The metal substrates include: zinc plated steel screws (Hillman, Zinc Plated Steel Hex Head Lag Screws, ¼ inch×2 inch, Lot No. 167421, item no. 230015), galvanized steel lag screws (Crown bolt, Hot Dip Galvanized Steel Hex Head Lag Screws, Lot No.=Box 3), brass machine screws (Bolt Depot, Brass Flat Head Slotted Machine Screws, ¼ inch×2 inch, Lot=sack with 400 pieces, item no. 104712), bronze tap bolts, stainless steel lag screws, and stainless steel tap bolts. The variety of commercial latexes include: UCAR™ Latexes DT211, DT250, and DT400, commercially available from The Dow Chemical Company. After 24 hours the bolts are removed as provided in Example 1. The dry plating after drying 2 hours at 120° C. is shown in FIG. 2.

Figure 2:
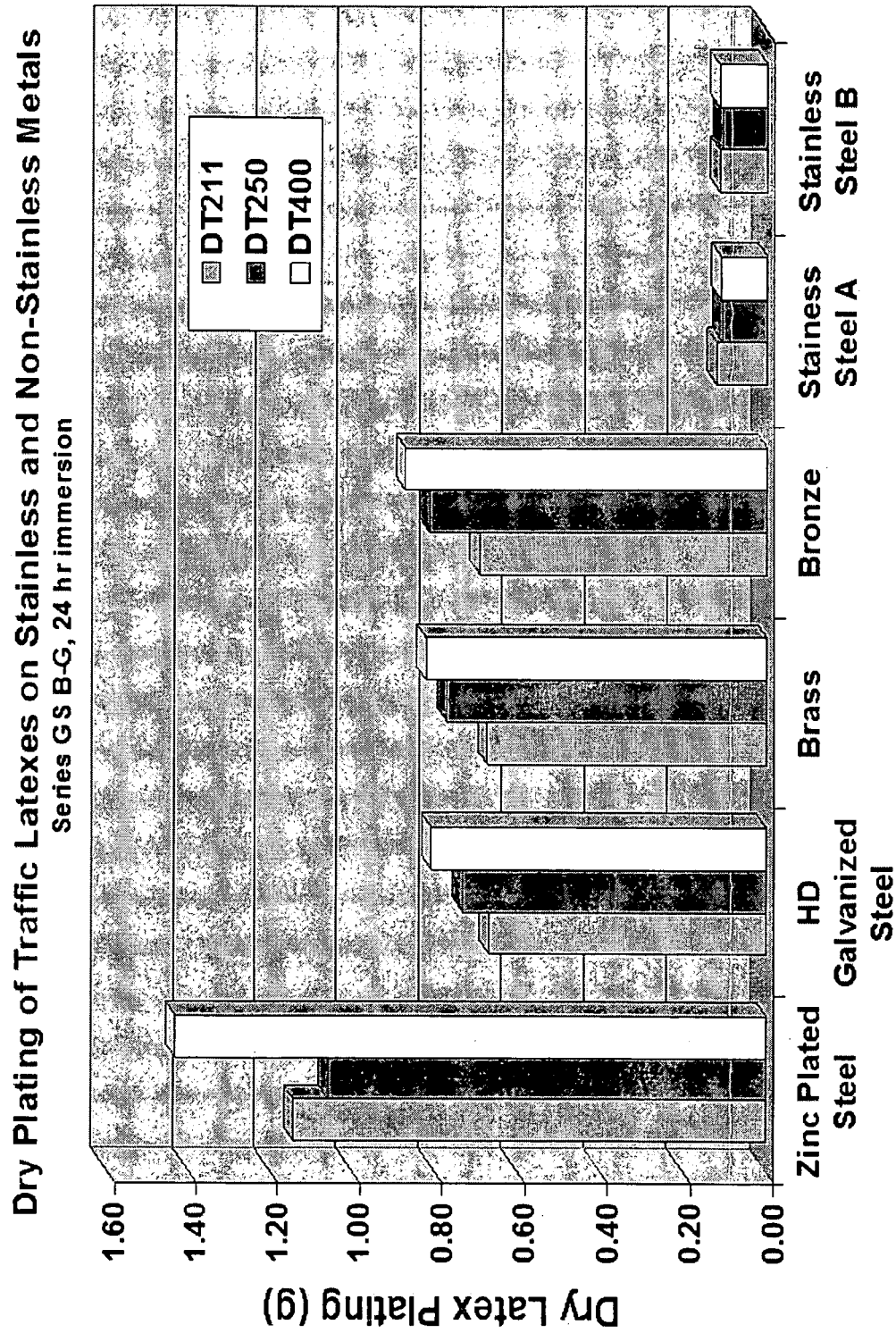
FIG. 2 is a graph illustrating the dry plating amount on stainless and non-stainless steel metals for several different coating compositions.

As shown in FIG. 2, all the latexes show some plating on the zinc plated steel substrates. The small amount of latex shown on stainless steel is latex that is retained between the screw threads when the bolt is removed from the test cell. This latex does not appear to be plated, as it can easily be washed off with a water rinse before drying. Plating on the other metal substrates, however, is substantially retained during rinsing.

Example 6

A hot dip galvanized steel lag screw is placed in a vial containing 15 ml of UCAR™ Latex DT250. The amount of plating and plating solids is monitored over a period of time and is shown in FIG. 3.

Figure 3:
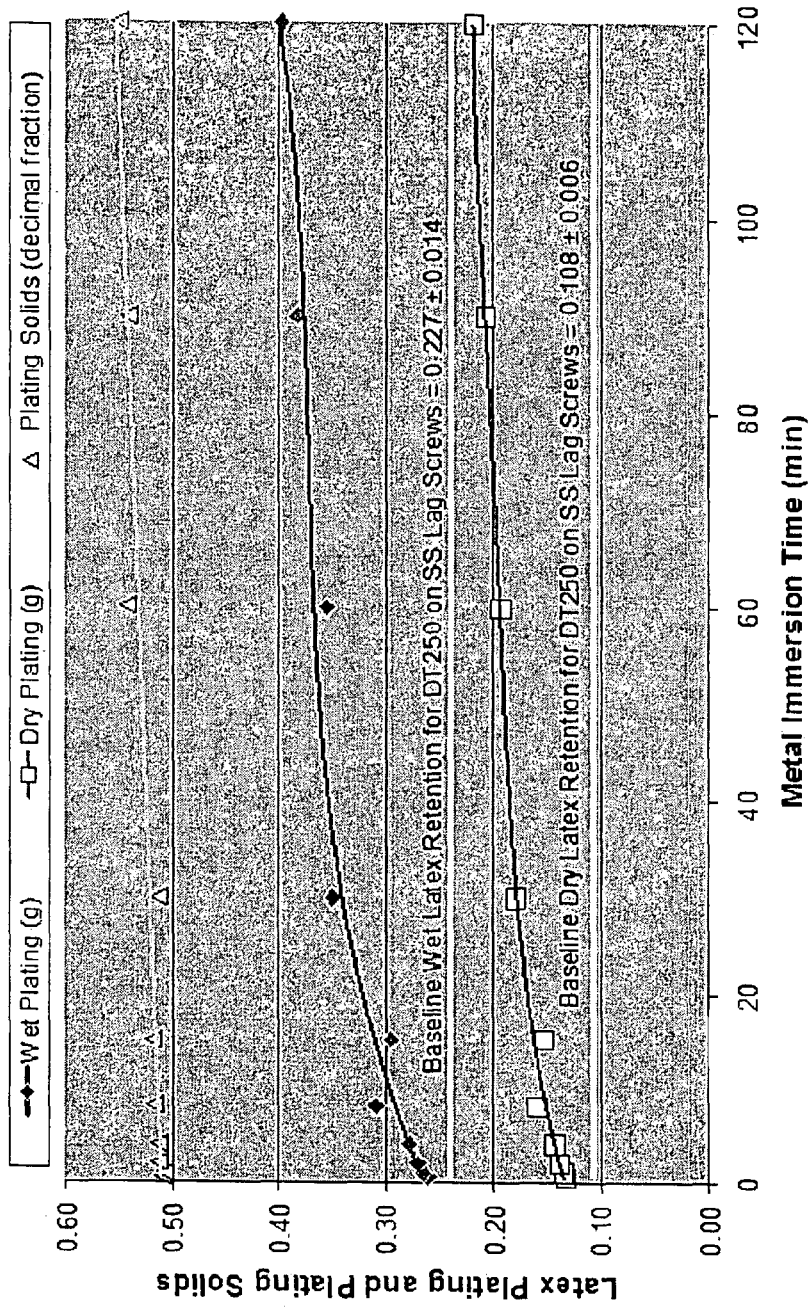
FIG. 3 is a graph illustrating the effect of a short duration immersion time on plating on galvanized steel.
Figure 4:
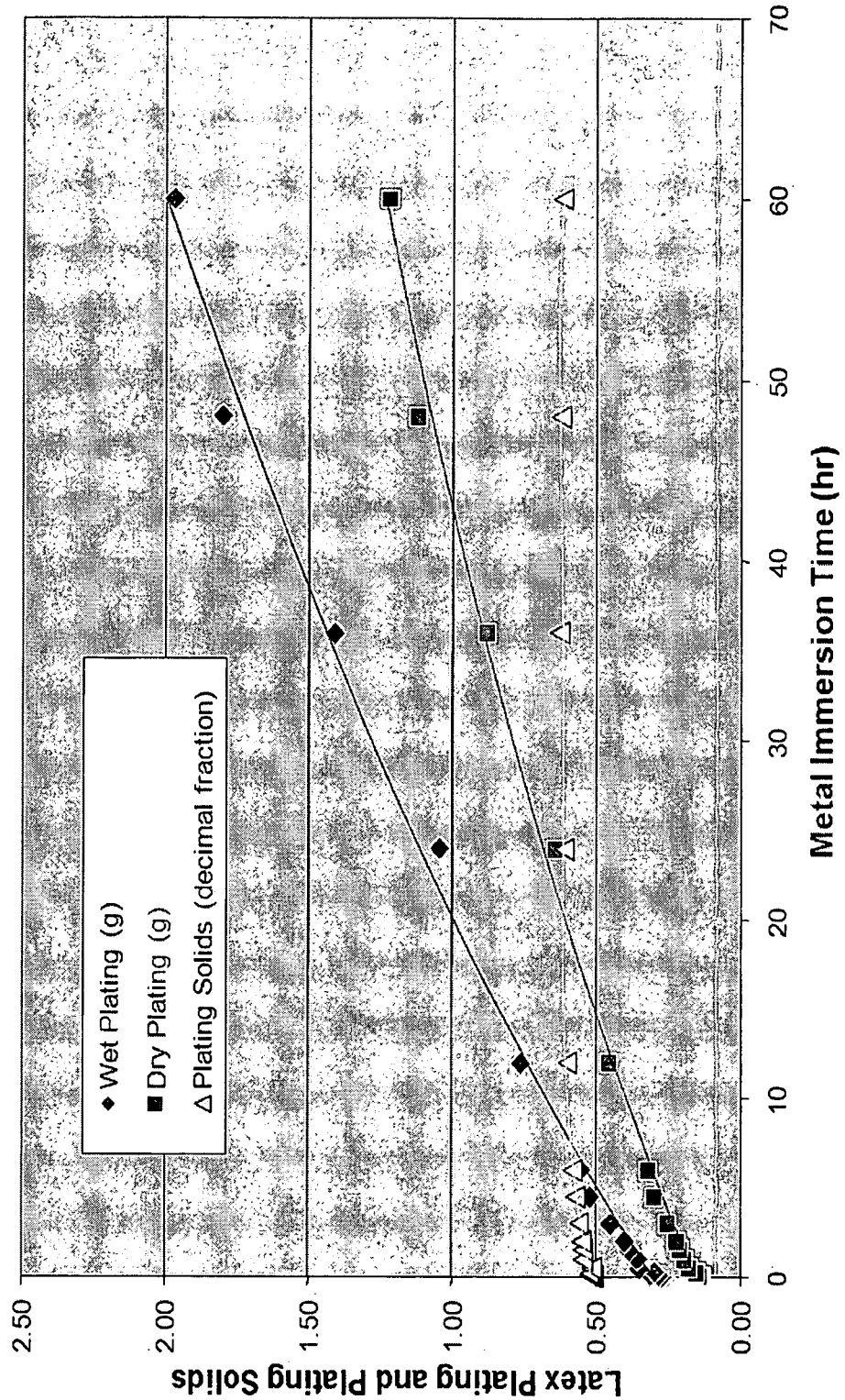
FIG. 4 is a graph illustrating the effect of immersion time on plating on galvanized steel.

As shown in FIG. 3, plating appears to begin upon immersion. FIG. 4 is an extension of FIG. 3 in a longer time frame.

As shown in FIG. 4, the latex coating continues to grow over time for as long as about 60 hours.

Example 7

A flat head solid brass machine screw is placed in a vial containing 15 ml of UCAR™ Latex DT250. The amount of plating and plating solids is monitored over a period of time, as shown in FIG. 5.

Figure 5:
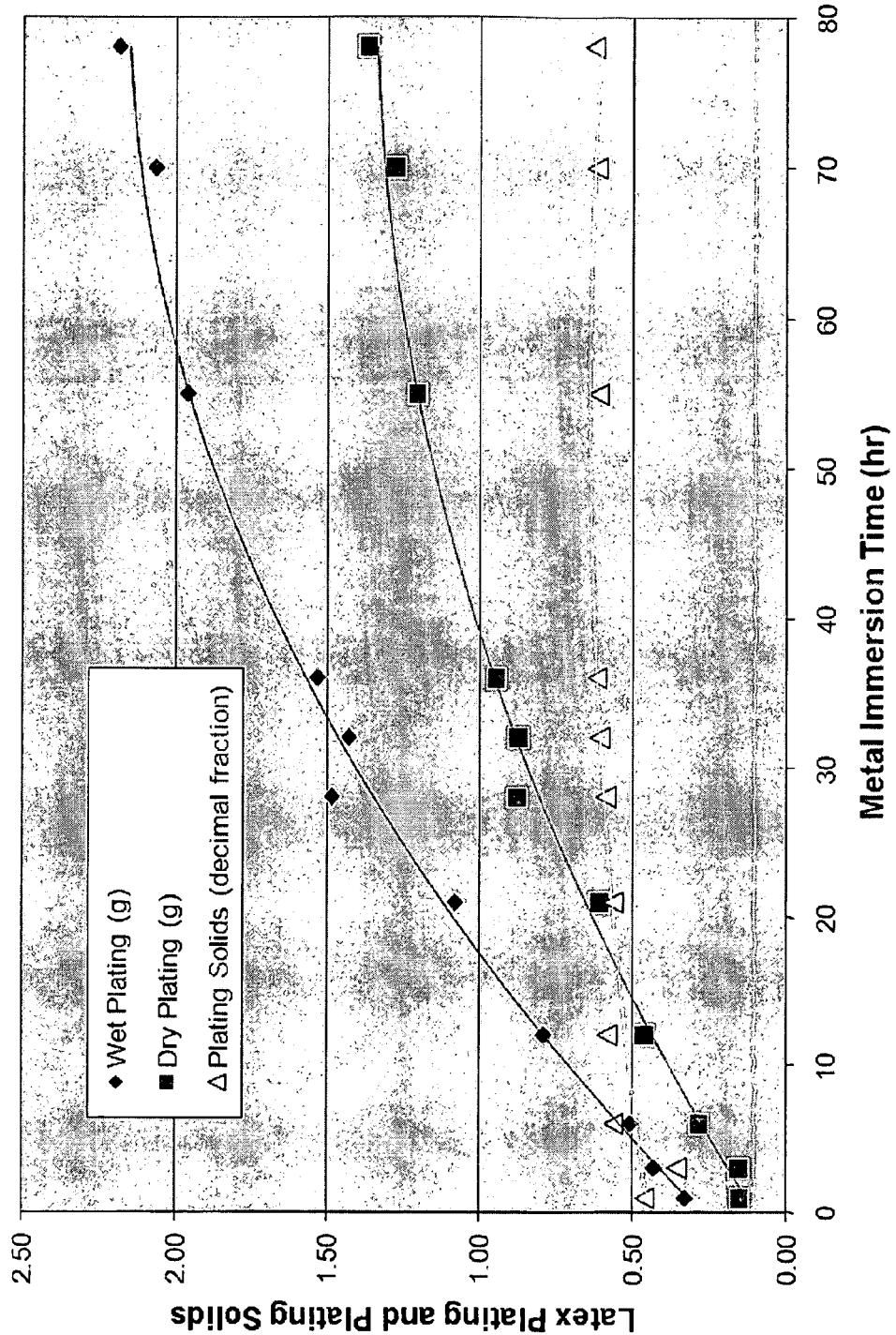
FIG. 5 is a graph illustrating the effect of immersion time on plating on brass.

As shown in FIG. 5, plating appears to begin upon immersion and continues to grow over time for as long as about 45 hours. After 45 hours, the latex coating continues to grow, however at a decreased rate as compared to the rate from hours 0 through 45.

Example 8

A variety of ¼ inch diameter metal substrates including 2 inch zinc plated steel lag screws, 2 inch hot dip galvanized steel lag screws, 2 inch brass machine screws, 2 inch aluminum screws, 2 inch welding steel, and a cut 2 inch section of black pipe (Southland Products, ⅜ inch diameter black pipe steel nipple, threaded ¾ inch on one end as supplied, GS quartered with hacksaw, washed with mineral spirits and acetone) are placed in vials containing 15 ml (28.0 g) of traffic paint containing UCAR™ Latex DT250. After 24 hours the bolt is removed and rinsed. The dry plating after drying 2 hours at 120° C. is shown in FIG. 6.

Figure 6:
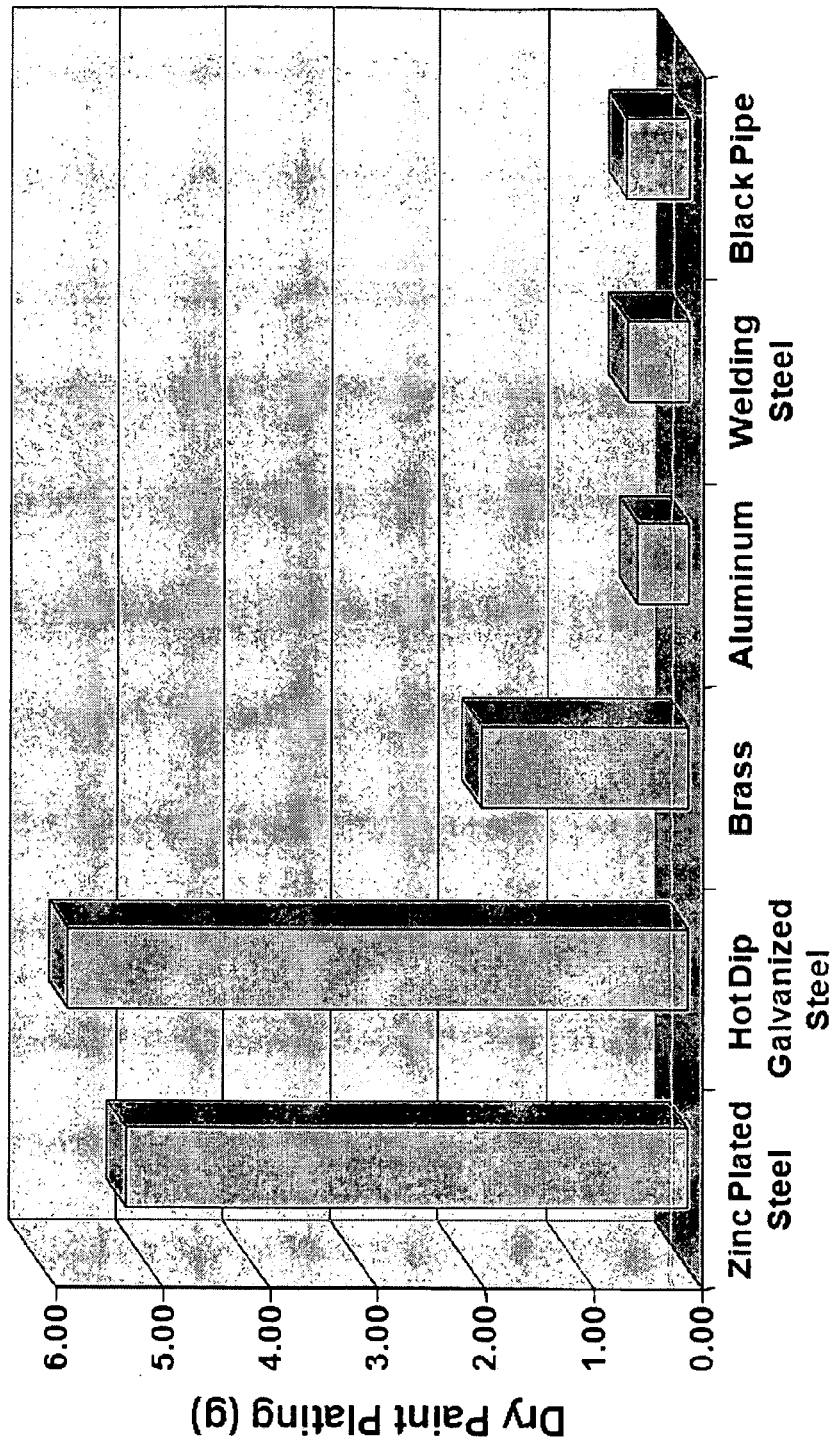
FIG. 6 is a graph illustrating the plating of a coating composition on different metals.

As shown in FIG. 6, plating occurs on all the metals, however, the most plating occurs on zinc plated steel and hot dip galvanized steel.

Example 9

A 2 inch zinc plated steel lag screw and a 2 inch stainless steel screw are placed in separate vials containing 15 ml (28.0) of traffic paint containing UCAR™ Latex DT250. After 24 hours the bolt is removed and rinsed. The dry plating after drying 2 hours at 120° C. is shown in FIG. 7.

Figure 7:
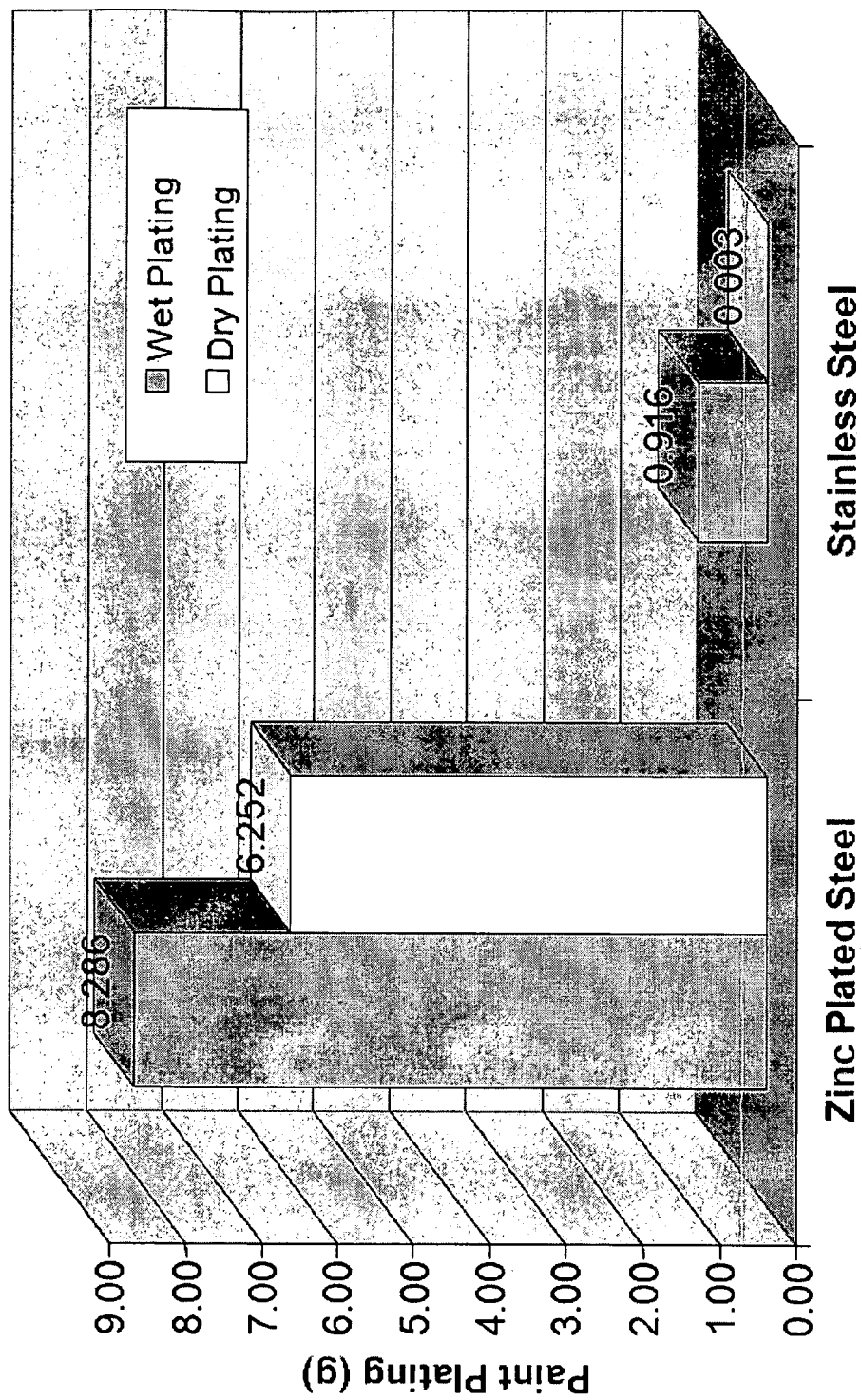
FIG. 7 is a graph illustrating the plating of a coating composition on zinc plated steel versus stainless steel.

As shown in FIG. 7, there is a large difference in paint deposition on the zinc plated steel as compared to the stainless steel.

Example 10

Samples of Dow Latex 41191 are treated with various amounts of ammonia and PEI in a four by three (4×3) level experimental design. The ammonia is varied from 1.0 to 2.0 parts active $NH_3$ on latex solids, and the PEI is varied from 0.5 to 2.0 parts active PEI on latex solids. 15 ml of each latex composition and a 2 inch zinc plated lag screw are placed into each vial. The lag screws are removed after 24 hours and the amount of latex plating on each screw is determined.

Figure 8:
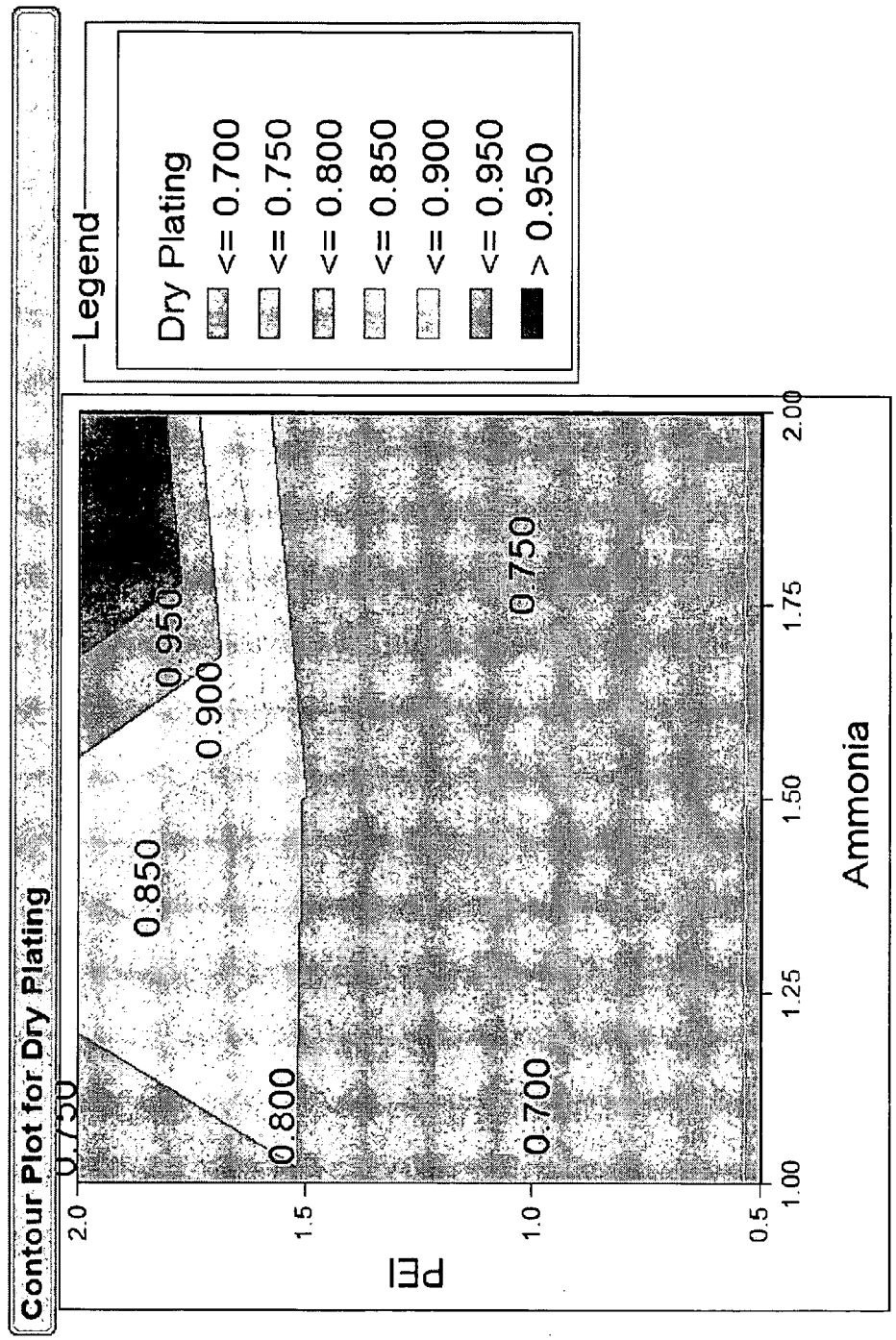
FIGS. 8-10 are graphs illustrating dry plating as a function of a base and a polyamine or polyimine for several different coating compositions.
Figure 9:
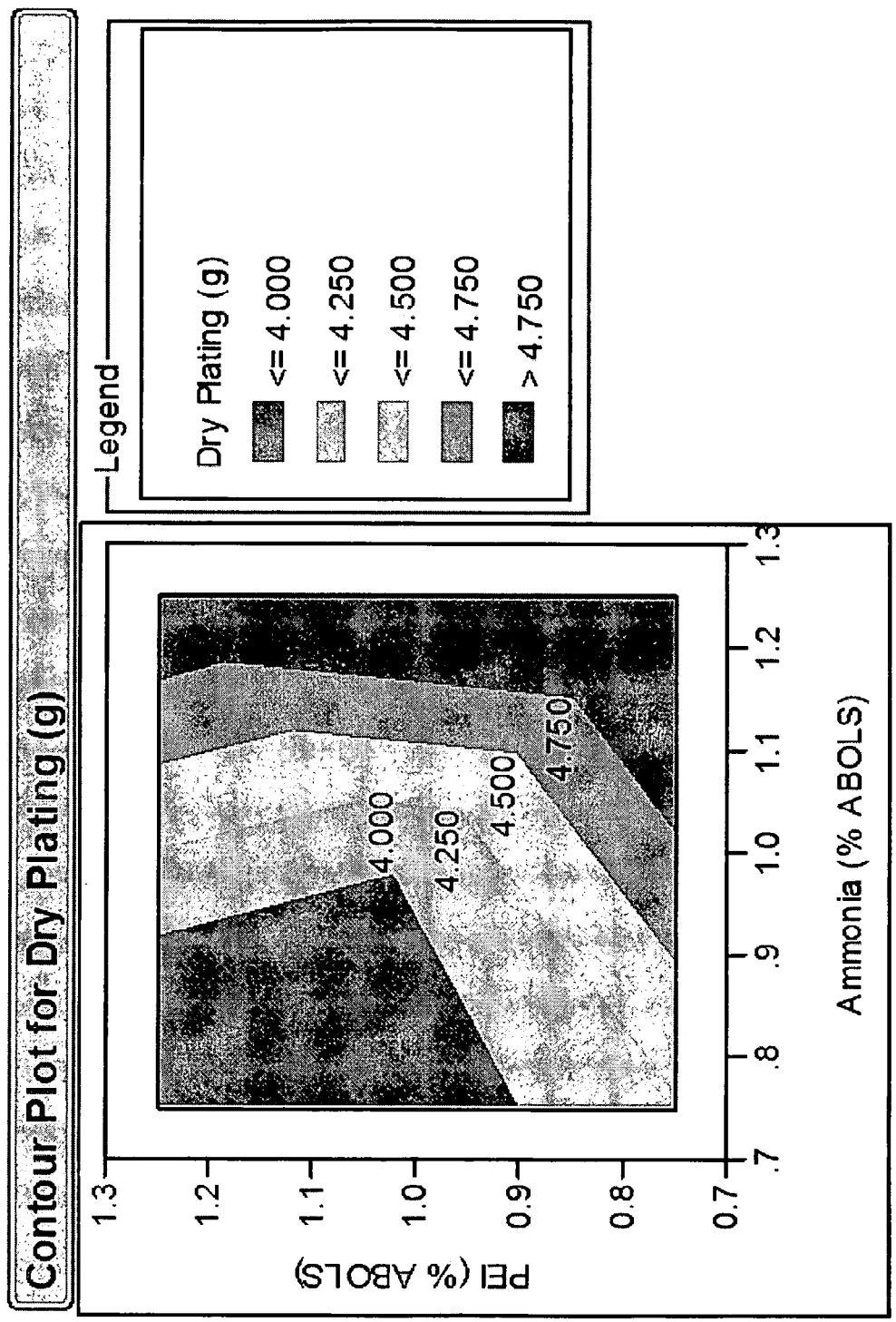

As shown in FIG. 8, plating on the metal substrate increases as the amount of PEI increases and as the pH of the coating composition increases. However, as shown in FIG. 8, the amount of plating has a greater dependence on the amount of PEI in the coating composition.

Example 11

Samples of Dow Latex 31215 are treated with various amounts of ammonia and PEI in a three level experimental design. The ammonia is varied from 0.7 to 1.3 parts active $NH_3$ on latex solids, and the PEI is varied from 0.7 to 1.3 parts active PEI on latex solids. 15 ml of each latex composition and a 2 inch zinc plated lag screw are placed into each vial. The lag screws are removed after 24 hr and the amount of latex plating on each screw is determined.

As shown in FIG. 8, plating on the metal substrate surface increases as the pH of the coating composition is increased. In this example, adding PEI to the coating composition does not appear to increase the amount of latex deposited on the metal substrate surface.

Example 12

Samples of paints made with Dow Latex 41191 are treated with various amounts of ammonia and PEI in a three level experimental design. The ammonia is varied from 0.80 to 1.6 parts active NH$_3$ on latex solids, and the PEI is varied from 1.0 to 1.5 parts active PEI on latex solids. Fifteen ml of each paint composition and a 2 inch zinc plated lag screw are placed into each vial. The lag screws are removed and rinsed after 24 hr and the amount of paint plating on each screw is determined.

Figure 10:
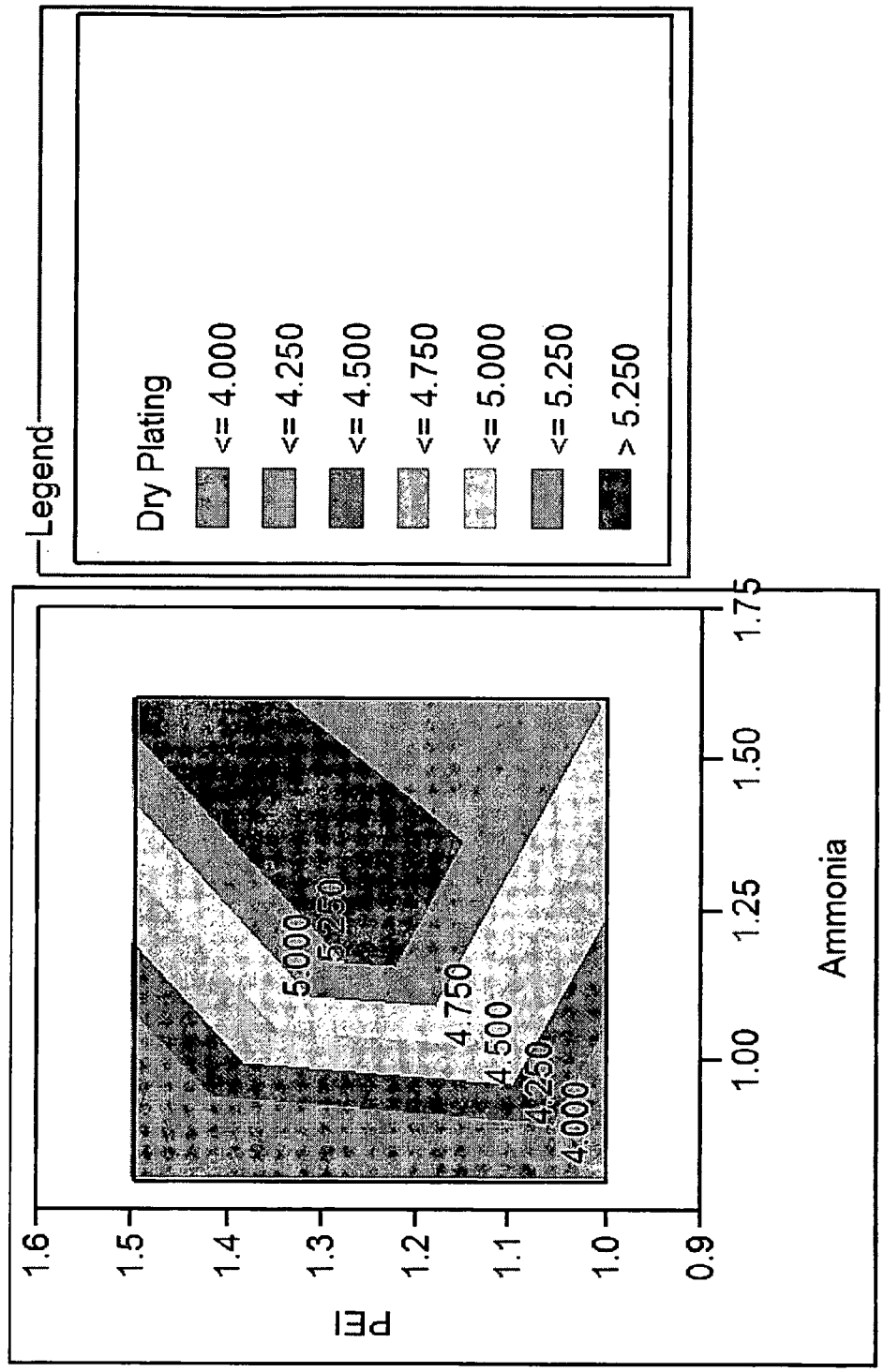

As shown in FIG. 10, plating on the metal substrate surface increases as the PEI and the pH concentrations are increased.

Example 13

Samples of Dow latexes 31215 and 41191 are treated with three levels of 28% aqueous ammonia up to 1.5% absolute on latex solids (% ABOLS) to give a range of pH from about 8.9 to about 10.3. In some samples, one percent PEI is added to samples of Dow Latexes 31215 and 41191 that had been neutralized to pH 10.0 with ammonia. The resulting pH after the PEI addition is about 10.2. All of the latexes are adjusted with deionized water to obtain a constant solids of 50.5 percent. Two inch zinc plated steel screws were placed in vials containing 15 ml of each coating composition including a latex and varying amounts of ammonia. After 24 hours the bolts are removed as provided in Example 1. Table 1 presents the ammonia and PEI added to Dow latexes 31215 and 41191 and the average latex deposition for each composition.

TABLE 1

| Latex | Ammonia Added (% ABOLS) | PEI Added (% ABOLS) | pH | Latex Deposition on ZPS Ave Wet Dep (g) | Ave Dry Dep (g) |
|---|---|---|---|---|---|
| 31215 | 0 | 0 | 8.86 | 0.33 | 0.17 |
| 31215 | 0.50 | 0 | 9.82 | 1.46 | 0.86 |
| 31215 | 1.00 | 0 | 10.11 | 1.43 | 0.85 |
| 31215 | 1.50 | 0 | 10.30 | 1.31 | 0.75 |
| 31215 | 1.00 | 1.00 | 10.18 | 2.22 | 1.24 |
| 41191 | 0 | 0 | 8.96 | 0.65 | 0.32 |
| 41191 | 0.50 | 0 | 9.86 | 1.60 | 0.95 |
| 41191 | 1.00 | 0 | 10.07 | 1.96 | 0.98 |
| 41191 | 1.50 | 0 | 10.27 | 1.88 | 1.14 |
| 41191 | 1.00 | 1.00 | 10.18 | 2.18 | 1.22 |

As shown in Table 1, the addition of a base can produce latex deposition on the zinc plated steel screws. In addition, the addition of a polyimine or polyamine, for example, polyethyleneimine increases the amount of deposition.

Example 14

A variety of commercial Dow latexes are selected that vary in polymer type, particle size, pH, solids content, surfactant stabilization type, and T$_g$. The pH for these latexes ranges from 4 to 9. Included are UCAR Latexes 300, 357, 627, 123, and 9165, NEOCAR Latexes 2300 and 2535, NEOCAR Acrylic Latexes 820 and 850. Three samples of each latex are used. The first set of latex samples are controls, and left untreated. The second set of samples are neutralized to pH 10 with 28% aqueous ammonia. The third set of samples were also neutralized to pH 10 with 28% aqueous ammonia, but 1.0% PEI is also added. Table 2 presents the latexes and the properties of each latex including solids content, particle size, T$_g$, surfactant stabilization type, and pH. In addition, Table 2 presents the pH of the latexes of the first, second, and third samples. Table 3 presents the wet and dry plating of the first, second, and third samples of each latex.

TABLE 2

| Latex | Type | Solids | PS | T$_g$ | Surf | Typical pH | Original pH | pH 10 | pH 10 + PEI |
|---|---|---|---|---|---|---|---|---|---|
| 300 | V/A | 55.0 | 0.3 | 5 | A/N | 4 | 4.23 | 9.86 | 9.92 |
| 357 | V/A | 56.6 | 0.3 | 23 | A | 5 | 4.58 | 9.87 | 9.93 |
| 627 | Acrylic | 43.5 | 0.1 | 15 | A | 9 | 9.31 | 10.03 | 10.04 |
| 850 | NeoA | 45.0 | 0.08 | 50 | A/N | 8.5 | 8.24 | 10.11 | 10.18 |
| 2300 | Neo | 55.0 | 0.3 | 20 | A/N | 5 | 3.81 | 9.91 | 9.94 |
| 820 | NeoA | 45.0 | 0.07 | 20 | A/N | 8.5 | 8.34 | 10.11 | 10.2 |
| 123 | S/A | 60.0 | 0.5 | −17 | None | 8.5 | 8.71 | 10.13 | 10.24 |
| 2535 | Neo | 53.5 | 0.3 | 10 | A/N | 7.5 | 5.34 | 9.98 | 10.06 |
| 9165 | Acrylic | 52.0 | 0.3 | −34 | A | 9 | 8.31 | 10.18 | 10.25 |
| Ave | | 51.7 | 0.3 | 10.2 | | 7.2 | 6.8 | 10.0 | 10.1 |

TABLE 3

| | Wet Plating | | | Dry Plating | | |
|---|---|---|---|---|---|---|
| Latex | Original pH | NH3 to pH 10 | NH3 to pH 10 + PEI | Standard pH | NH3 to pH 10 | NH3 to pH 10 + PEI |
| 300 | 0.225 | 0.233 | 0.244 | 0.050 | 0.063 | 0.065 |
| 357 | 0.448 | 0.707 | 1.910 | 0.223 | 0.370 | 1.206 |
| 627 | 0.280 | 0.640 | 1.433 | 0.048 | 0.320 | 0.725 |
| 850 | 0.362 | 1.861 | 3.364 | 0.059 | 0.513 | 1.582 |
| 2300 | 0.344 | 0.285 | 0.305 | 0.097 | 0.055 | 0.082 |
| 820 | 0.300 | 0.649 | 3.357 | 0.040 | 0.272 | 1.818 |
| 123 | 0.316 | 0.534 | 2.824 | 0.144 | 0.252 | 1.785 |
| 2535 | 0.203 | 0.244 | 3.095 | 0.080 | 0.079 | 1.582 |
| 9165 | 0.432 | 1.458 | 1.233 | 0.200 | 0.682 | 0.661 |
| Ave | 0.323 | 0.735 | 1.974 | 0.105 | 0.290 | 1.056 |

As shown in Table 3, elevated pH with ammonia is effective for latex deposition with a variety of latex types. In addition, for the samples with PEI at pH 10, there is an increase in latex deposition on metal. Therefore, the presence of polyamine or polyimine at elevated pH is effective for latex deposition with a variety of latex types. Also, two of the latexes tested are low T$_g$, for example, latex 123 has a T$_g$ of −17° C. and latex 9165 has a T$_g$ of −34° C. Both of these latexes have significant latex deposition on metal. The deposited latex from these latexes is tacky when dry. On the other hand, latex 850 has a T$_g$ of 50° C. and gave similar plating results but with hard, or ceramic-like, plating.

Example 15

A variety of commercial Dow latexes are selected that vary in polymer type, particle size, pH, solids content, surfactant stabilization type, and T$_g$. The original pH for these latexes ranges from 4.7 to 8.8. Included are UCAR Latexes 629, 657, 435, DM166, DL215, DM171, 379G, EVOCAR Latex DA280, and Dow Latex 41191. Two samples of each latex are used for testing. The first set of latex samples are controls at the original pH. The second set of samples are neutralized to pH 10 with 28% aqueous ammonia. The third set of samples are also neutralized to pH 10 with 28% aqueous ammonia, but 1.0% PEI active on latex solids is also added. Table 4 presents the latexes, their properties, including solids content, particle size, $T_g$, and the original measured pH. Table 5 presents the average wet plating, dry plating, and plating solids of the first, second, and third samples of each latex. The overall average data for all latexes is shown.

TABLE 4

| Latex | | Typical Latex Properties | | | Measured |
|---|---|---|---|---|---|
| Code | Polymer Type | Solids (%) | pH | PS (microns) | $T_g$ (° C.) | Original pH |
| 629 | Acrylic | 55 | 7.5 | 0.2 | 5 | 7.45 |
| 657 | Acrylic | 58 | N/A | 0.3 | 14 | 8.77 |
| 435 | Acrylic | 45 | 8.5 | 0.25 | 19 | 8.25 |
| DA280 | Vinyl Acetate Ethylene | 55 | 5 | 0.35 | 11 | 5.10 |
| DM166 | Styrene Acrylic | 41 | 7.5 | 0.1 | 36 | 7.57 |
| DL215 | Styrene Butadiene | 49 | 7.8 | 0.1 | 39 | 7.40 |
| DM171 | Styrene Butadiene | 49.7 | 8.3 | N/A | <32 | 7.82 |
| 379G | Vinyl Acrylic | 55 | 5 | 0.3 | 19 | 4.74 |
| 41191 | Styrene Acrylic | 50.5 | 9 | 0.2 | 18 | 8.70 |
| Averages for all latexes | | 50.9 | — | — | — | 7.31 |

TABLE 5

| | Wet Plating* | | | Dry Plating* | | | Plating Solids* | | |
|---|---|---|---|---|---|---|---|---|---|
| Code | Latex at Original pH (g) | Latex at pH 10 with Ammonia (g) | Latex pH 10 + PEI** (g) | Latex at Original pH (g) | Latex at pH 10 with Ammonia (g) | Latex pH 10 + PEI** (g) | Latex at Original pH (g) | Latex at pH 10 with Ammonia (g) | Latex pH 10 + PEI** (g) |
| 629 | 0.342 | 1.054 | 1.246 | 0.175 | 0.621 | 0.785 | 51.2 | 58.6 | 63.0 |
| 657 | 0.322 | 1.474 | 1.873 | 0.182 | 0.925 | 1.092 | 56.6 | 62.4 | 58.3 |
| 435 | 0.266 | 0.253 | 0.283 | 0.114 | 0.098 | 0.091 | 42.8 | 38.7 | 32.2 |
| DA280 | 0.265 | 0.244 | 0.250 | 0.135 | 0.121 | 0.123 | 50.8 | 49.7 | 49.4 |
| DM166 | 0.258 | 0.229 | 0.259 | 0.073 | 0.081 | 0.103 | 28.4 | 35.2 | 40.0 |
| DL215 | 0.256 | 0.375 | 0.769 | 0.107 | 0.183 | 0.336 | 41.8 | 48.4 | 43.6 |
| DM171 | 0.326 | 0.426 | 0.643 | 0.160 | 0.231 | 0.321 | 49.0 | 54.2 | 49.4 |
| 379G | 0.315 | 0.295 | 0.259 | 0.155 | 0.163 | 0.141 | 49.4 | 55.3 | 54.4 |
| 41191 | 0.555 | 0.865 | 1.330 | 0.270 | 0.493 | 0.777 | 49.1 | 57.1 | 58.8 |
| Average for all latexes | 0.323 | 0.579 | 0.768 | 0.152 | 0.324 | 0.419 | 46.6 | 51.1 | 49.9 |

*Data are average of two tests per sample
**PEI concentration is 1.0% active on latex solids As shown in Table 5, for some latexes, elevated pH with ammonia is effective for latex deposition. In addition, for some latexes with PEI at pH 10, there is a further increase in latex deposition on metal. Therefore, the presence of polyamine or polyimine at elevated pH is effective for latex deposition with a variety of latex types.

Example 16

Two inch zinc plated steel screws and 2 inch brass tap bolts were immersed in vials including 20 ml of Dow latex 41191 with varying amounts of sodium hydroxide. Each latex sample is adjusted with deionized water to the same latex solids (50.5%) before metal immersion. After 24 hours the metal is removed. Table 6 presents the wet and dry plating on the zinc plated steel at various pHs while Table 7 presents the wet and dry plating on the brass at various pHs.

TABLE 6

| | 41191 Latex pH Adjusted with 20% NaOH | | | | Autodep on ZPS | |
|---|---|---|---|---|---|---|
| | NaOH (% ABOLS) | PEI (% ABOLS) | Latex Solids (%) | pH | Wet Plating (g) | Dry Plating (g) |
| L1 | None | None | 50.5 | 9.37 | 0.428 | 0.223 |
| L2 | 0.1 | None | 50.5 | 9.63 | 0.635 | 0.355 |
| L3 | 0.2 | None | 50.5 | 9.78 | 0.842 | 0.477 |
| L4 | 0.3 | None | 50.5 | 9.93 | 0.819 | 0.478 |
| L5 | 0.4 | None | 50.5 | 10.14 | 0.856 | 0.509 |
| L6 | 0.5 | None | 50.5 | 10.32 | 0.808 | 0.439 |
| L7 | 0.6 | None | 50.5 | 10.54 | 0.570 | 0.305 |
| L8 | 0.7 | None | 50.5 | 10.63 | 0.415 | 0.208 |
| L9 | 0.5 | 1.0 | 50.5 | 10.67 | 0.731 | 0.433 |

TABLE 7

| | 41191 Latex pH Adjusted with 20% NaOH | | | | Autodep on Brass | |
|---|---|---|---|---|---|---|
| | NaOH (% ABOLS) | PEI (% ABOLS) | Latex Solids (%) | pH | Wet Plating (g) | Dry Plating (g) |
| L1 | None | None | 50.5 | 9.37 | 0.268 | 0.133 |
| L2 | 0.1 | None | 50.5 | 9.63 | 0.278 | 0.118 |

TABLE 7-continued

| | 41191 Latex pH Adjusted with 20% NaOH | | | | Autodep on Brass | |
|---|---|---|---|---|---|---|
| | NaOH (% ABOLS) | PEI (% ABOLS) | Latex Solids (%) | pH | Wet Plating (g) | Dry Plating (g) |
| L3 | 0.2 | None | 50.5 | 9.78 | 0.298 | 0.135 |
| L4 | 0.3 | None | 50.5 | 9.93 | 0.305 | 0.148 |
| L5 | 0.4 | None | 50.5 | 10.14 | 0.337 | 0.165 |
| L6 | 0.5 | None | 50.5 | 10.32 | 0.385 | 0.174 |
| L7 | 0.6 | None | 50.5 | 10.54 | 0.561 | 0.234 |

TABLE 7-continued

| | 41191 Latex pH Adjusted with 20% NaOH | | | | Autodep on Brass | |
|---|---|---|---|---|---|---|
| | NaOH (% ABOLS) | PEI (% ABOLS) | Latex Solids (%) | pH | Wet Plating (g) | Dry Plating (g) |
| L8 | 0.7 | None | 50.5 | 10.63 | 0.477 | 0.237 |
| L9 | 0.5 | 1.0 | 50.5 | 10.67 | 0.849 | 0.400 |

As shown in Tables 6 and 7, raising the pH of the coating composition with sodium hydroxide (NaOH) increases autodeposition, reaching a maximum at pH 9.8-10.3 on the zinc plated steel and a maximum at pH 10.5 on brass. In addition, although the autodeposition with NaOH appears to be less effective than with ammonia, as shown in Table 1, the use of NaOH does increase the autodeposition of the latex. As with previous examples, the addition of PEI gives a boost in deposition at the pH chosen for examination.

What is claimed:

1. A process for autodepositing a coating on a metal substrate surface, comprising:
immersing at least a portion of the metal substrate surface in an autodepositing aqueous, alkaline coating composition including a latex, at least one of the group consisting of polyimine and polyamine, and an amount of base sufficient to raise the pH of the composition to an alkaline pH of at least about 7.1 to about 12, where the coating composition is free of added oxidizing agent and hydrofluoric acid, whereby the coating autodeposits on the metal substrate surface.

2. The process of claim 1, where the coating has a thickness of at least about ¼ inch.

3. The process of claim 1, where the latex is selected from a group consisting of an unpigmented latex, a pigmented latex paint, and a fast-hardening traffic latex paint.

4. The process of claim 1, where the metal substrate surface is a non-stainless steel metal selected from a group consisting of copper, bronze, iron, zinc, aluminum, zinc plated steel, hot dip galvanized steel, and alloys thereof.

5. The process of claim 1, where the coating composition autodeposits a film on at least a portion of the metal substrate surface in less than about 5 seconds.

6. The process of claim 1, where the latex concentration is greater than one weight percent of the total composition.

7. The process of claim 1, where the coating composition pH is raised to a pH in a range of about 9.5 to about 11.5.

8. The process of claim 1, where the coating composition includes a latex having a $T_g$ of greater than about 40 degrees Celsius to produce a hard, ceramic-like coating on the metal substrate surface.

9. The process of claim 1, where the coating composition includes a latex having a $T_g$ in a range of about −70 degrees Celsius to about 25 degrees Celsius to produce a soft, tacky coating on the metal substrate surface.

10. The process of claim 1, where the base is one or more bases selected from the group consisting of ammonia, sodium hydroxide, potassium hydroxide, barium hydroxide, cesium hydroxide, calcium hydroxide, lithium hydroxide, tetramethyl ammonium hydroxide, tetraethylammonium hydroxide, dimethylamine, diethylamine, aminopropanol, 2-amino-2-methyl-1 propanol, methylamine, propylamine, and 2-propylamine.

11. A process for autodepositing a coating on a metal substrate surface, comprising:
immersing at least a portion of the metal substrate surface in an autodepositing, aqueous, alkaline coating composition that includes a latex, an amount of base sufficient to raise the pH of the composition to an alkaline pH of at least about 9.5 to about 11.5, said base selected from the group consisting of ammonia, sodium hydroxide, potassium hydroxide, barium hydroxide, cesium hydroxide, calcium hydroxide, lithium hydroxide, tetramethyl ammonium hydroxide, tetraethylammonium hydroxide, amine, and mixtures thereof, and optionally polyimine or polyamine or both, where the coating composition is free of added oxidizing agent and hydrofluoric acid, whereby the coating autodeposits on the metal substrate surface.

* * * * *